United States Patent
Matsushiro et al.

(10) Patent No.: US 6,954,547 B2
(45) Date of Patent: Oct. 11, 2005

(54) METHOD OF DERIVING SPECTRAL SENSITIVITY CHARACTERISTICS FOR COLOR IMAGE INPUTTING DEVICE AND APPARATUS FOR SAME

(75) Inventors: Nobuhito Matsushiro, Tokyo (JP); Yukio Endo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 542 days.

(21) Appl. No.: 10/016,423

(22) Filed: Oct. 26, 2001

(65) Prior Publication Data

US 2002/0085751 A1 Jul. 4, 2002

(30) Foreign Application Priority Data

Nov. 6, 2000 (JP) ......................................... 2000-337841

(51) Int. Cl.[7] ................................................ G06K 9/00
(52) U.S. Cl. ...................................... 382/162; 358/518
(58) Field of Search ............................... 382/162–167; 356/402; 358/518

(56) References Cited

U.S. PATENT DOCUMENTS

| | | | |
|---|---|---|---|
| 5,791,781 A | * | 8/1998 | Park et al. .................. 374/159 |
| 6,023,525 A | * | 2/2000 | Cass ........................... 382/162 |
| 6,337,923 B1 | * | 1/2002 | Yoon et al. .................. 382/167 |
| 6,560,358 B1 | * | 5/2003 | Tsukada ....................... 382/167 |
| 6,600,833 B1 | * | 7/2003 | Tan et al. ..................... 382/167 |

FOREIGN PATENT DOCUMENTS

JP    7-20585    1/1995    ........... G03B/27/73

* cited by examiner

*Primary Examiner*—Bhavesh M. Mehta
*Assistant Examiner*—Dennis Rosario
(74) *Attorney, Agent, or Firm*—Akin Gump Strauss Hauer & Feld, LLP

(57) ABSTRACT

A method for obtaining spectral sensitivity characteristics of a color image input device such as a color scanner or a like is provided.

The most optimum spectral sensitivity characteristics of the color image input device can be obtained by amending CIE XYZ color matching functions so that X, Y and Z values of two color stimuli perceived to be the same in color by observation under a specific illuminant are made equal and by performing linear transformation on the amended color matching function.

4 Claims, 3 Drawing Sheets

METHOD OF DERIVING SPECTRAL SENSITIVITY CHARACTERISTICS FOR COLOR IMAGE INPUTTING DEVICE AND APPARATUS FOR SAME

BACKGROUND OF THE INVENTION

1. Field of the Invention

The present invention relates to a method for deriving spectral sensitivity characteristics suitably used for obtaining the spectral sensitivity characteristic in a color image inputting device, in particular, in a color scanner, and to an apparatus for the same.

2. Description of the Related Art

It is becoming important to accurately reproduce colors of an original subject from color image signals taken from a color image signal input device such as color scanners, digital cameras or a like achieving remarkably widespread use in recent years by using a color image signal output device such as color monitors, color printers or a like.

In response to such needs, a method of image processing is disclosed (for example, in Japanese Patent Application No. Hei 7-20585) in which a color adjustment is made to colors produced from an image signal inputted from the color image signal input device. In the disclosed image processing, the image signal inputted from the color image signal input device is transformed to image data (X, Y and Z values) in a CIE (Commisson Internationale de L'eclarge) XYZ colorimetric system and, after the transformed image data has been transformed to data (L*, a* and b* values) in a uniform color space (for example, CIE LAB color space) based on a reference white, colors desired to be amended are designated and the designated colors are again transformed to the image data (X', Y' and Z' values) in the CIE XYZ colorimetric system by increasing and decreasing the L*, a*, b* values according a difference between the color space data possessed by the designated color and color space data obtained after the transforming processing. In the image processing, since an increased and decreased amount of each of coordinate component values making up color space data is calibrated while seeing the input image by a monitor, it is possible to make the amendment to the input image so as to have a desired color balance.

Thus, in the conventional technology in which the image processing is performed by using the X, Y and Z values in the CIE XYZ system or the L*, a*, b* in the CIE LAB color space, color matching functions in the CIE XYZ colorimetric system are used as standard color matching functions. However, it is generally impossible to make equal the X, Y and Z values of two stimuli each having a different spectral reflectance factor perceived to be the same in color in a specific illuminant, by observation in a specific color matching evaluation experiment, by using the color matching functions in the CIE XYZ colorimetric system. Due to this, two stimuli perceived by the observation to be same in color in the specific illuminant are considered to be different in color and, as a result, after the input image signal is acquired, the color calibration is performed even on the color stimuli requiring no amendment.

That is, in the conventional image processing, to transform color data in a colorimetric system taken from the color image input device to that in other colorimetric system, it is necessary to obtain spectral sensitivity characteristics of the input device. The spectral sensitivity characteristics are represented by tristimulus values and each stimulus value is calculated by using a standard color matching function designated by the CIE. However, when the standard color matching function designated by the CIE is used, even a color perceived by a human to be the same in color is considered to be different in color and therefore it is impossible to obtain proper spectral sensitivity characteristics by the conventional method of deriving the spectral sensitivity characteristic and is difficult to achieve a proper transformation of color data by the conventional method.

SUMMARY OF THE INVENTION

In view of the above, it is an object of the present invention to provide a novel and useful method for deriving spectral sensitivity characteristics of a color image input device to transform data taken from the color image input device such as a color scanner or a like.

According to a first aspect of the present invention, there is provided a method for deriving spectral sensitivity characteristics of the color image input device, including:

a step of setting a constraint that tristimulus values of metamer data perceived to be the same in color by observation in a color matching evaluation experiment are made equal, to the metamer data;

a step of obtaining a third objective function by assigning weights to a first objective function including a standard color matching function and to a second objective function in a uniform color space and by binding these two objective functions together;

a step of obtaining, by using the method of Lagrange multipliers, a correcting color matching function used for correction to make the third objective function minimum under the constraint;

a step of obtaining an amended color matching function to be amended based on a sum of the obtained correcting color matching function and the standard color matching function; and a step of obtaining spectral sensitivity characteristics amended by using the amended color matching function.

In the foregoing, a preferable mode is one wherein the tristimulus values are CIE XYZ values and wherein the first objective function is a standard color matching function in a CIE XYZ colorimetric system and the second objective function is an objective function in CIE LAB color space.

Also, a preferable mode is one wherein the metamer data includes spectral distribution data of light from an illuminant in an environment where the color matching evaluation experiment is performed, a spectral reflectance factor of a reference color stimulus used in the color matching evaluation experiment, and spectral reflectance factors of two or more color stimuli perceived to be the same in color as the reference color stimulus by observation in the color matching evaluation experiment.

Also, a preferable mode is one that wherein includes a step of excluding an inexact metamer data that is observed in the color matching evaluation experiment.

According to a second aspect of the present invention, there is provided a spectral sensitivity characteristic deriving apparatus for obtaining spectral sensitivity characteristics, including:

a metamer data processing section to set a constraint that tristimulus values of metamer data perceived to be the same in color by observation in a color matching evaluation experiment are made equal, to the metamer data;

an objective function setting section to obtain a third objective function by assigning weights to a first objective function including a standard color matching function and to a second objective function in a uniform color space and by binding these two objective functions together; and an amended color matching calculating and processing section to obtain, by using the method of Lagrange multipliers, a correcting color matching function used for correction to make the third objective function minimum under the constraint, to obtain an amended color matching function to be amended based on a sum of the obtained correcting color matching function and the standard color matching function and to obtain spectral sensitivity characteristics amended by using the amended color matching function.

In the foregoing, a preferable mode is one wherein the metamer data processing section sets the constraint that CIE XYZ values of metamer data are made equal, to the metamer data.

Also, a preferable mode is one wherein the objective function setting section obtains the third objective function from the standard color matching function in the CIE XYZ colorimetric system being the first objective function and an objective function in a CIE LAB color space being the second objective function.

Also, a preferable mode is one wherein the metamer data includes spectral distribution data of light from an illuminant in an environment where the color matching evaluation experiment is performed, a spectral reflectance factor of a reference color stimulus used in the color matching evaluation experiment, and spectral reflectance factors of two or more color stimuli perceived to be the same in color as the reference color stimulus by observation in the color matching evaluation experiment.

Furthermore, a preferable mode is one that wherein includes a conditional expression judgement processing section to exclude an inexact metamer data that is observed in the color matching evaluation experiment.

With the above configurations, the correcting color matching function is calculated which minimizes the third objective function obtained by inputting the pair of spectral reflectance factors of the metamer data perceived to be the same in color by observation in the color matching evaluation experiment and, under the constraint that the CIE XYZ values of the noise averaged metamer data are made equal, by assigning weights to the first objective function in the CIE XYZ colorimetric system and to the second objective function in the CIE LAB color space and by binding these two objective functions together and then the amended color matching function that is to be amended based on the sum of the obtained correcting color matching function and the standard color matching function is calculated. By taking the minimization of the objective function into consideration, no difference is found in the form on a chromaticity diagram between the amended color matching function to be calculated and the standard color matching function and near values are provided by corresponding points between the amended color matching function and the standard color matching in the CIE LAB color space. Moreover, under the set constraint, by using the amended color matching function, the X, Y and Z values of the metamer data obtained from the color matching evaluation experiment can be made equal. By performing the linear transformation on the amended color matching function having such characteristics as described above, the properly-amended spectral sensitivity characteristics of the color image inputting device can be derived.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENTS

Best modes of carrying out the present invention will be described in further detail using various embodiments with reference to the accompanying drawings.

First Embodiment

Figure 1:
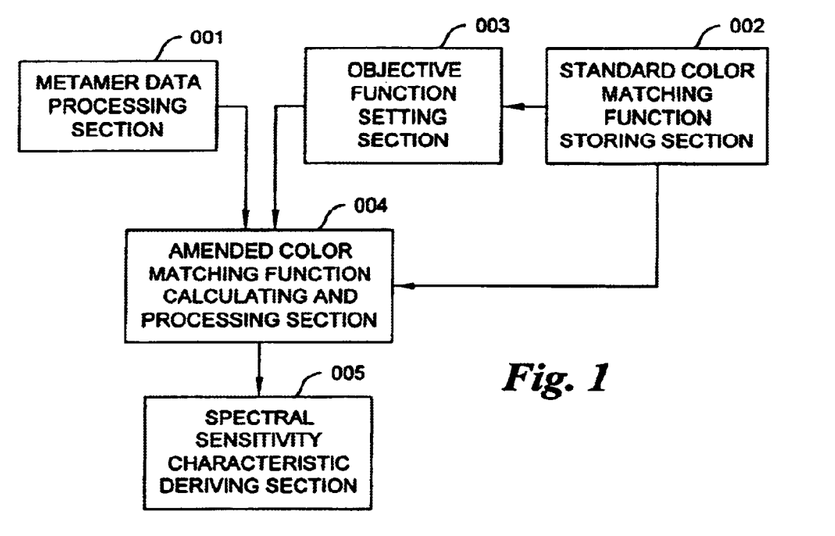
FIG. 1 is a block diagram showing a spectral sensitivity characteristic deriving apparatus according to a first embodiment.

Configurations of the first embodiment will be described in detail by referring to FIGS. 1, 2, 3 and 4. FIG. 1 is a block diagram showing an entire processing system of the first embodiment. First, an outline of an entire system of the image processing of the embodiment will be explained.

The color image input device of the present invention has a spectral sensitivity characteristic deriving apparatus used to obtain spectral sensitivity characteristics and the spectral sensitivity characteristic deriving apparatus, as shown in FIG. 1, includes a metamer data processing section 001 a standard color matching function storing section 002 used to store a standard color matching function being a first color matching function, an objective function setting section 003, an amended color matching function calculating and processing section 004 used to calculate an amended color matching function and a spectral sensitivity characteristic deriving section 005 used to calculate the spectral sensitivity characteristics of the color image input device using the amended color matching function. The color image input device includes, for example, an image input device such as a color scanner.

The metamer data processing section 001 performs processing of the metamer data determined in a color matching evaluation experiment. The standard color matching function storing section 002 stores color matching functions in the CIE XYZ colorimetric system shown in the following expression (1).

$$\bar{x}(\lambda), \bar{y}(\lambda), \bar{z}(\lambda) \tag{1}$$

The objective function setting section 003 performs setting of a third objective function (described later) using the color matching function stored in the standard color matching function storing section 002, that is, a first objective function.

The amended color matching function calculating and processing section 004, in order to handle a problem of minimization of the third objective function set by the objective function setting section 003, under the constraint determined by the metamer data processing section 001, calculates the correcting color matching function for the correction to make the third objective function minimum by using the method of Lagrange multipliers and calculates the amended color matching function that has been amended by using the correcting color matching function. The amended color matching function to be calculated here is used to make equal the XYZ values of color stimuli that have been perceived to be the same in color by observation in the color matching evaluation experiment. The spectral sensitivity characteristic deriving section 005 performs linear transformation of the amended color matching function calculated by the amended color matching function calculating and processing section 004 in order to obtain the spectral sensitivity characteristics of the color image inputting device.

Figure 2:
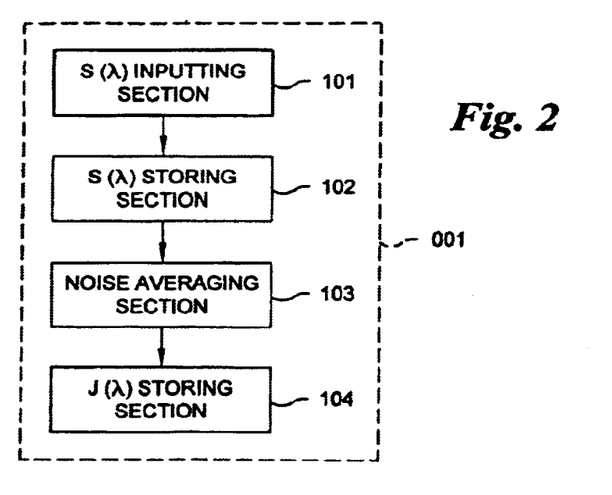
FIG. 2 is a block diagram showing, in detail, the metamer data processing section shown in FIG. 1.

FIG. 2 is a block diagram showing, in detail, the metamer data processing section 001 in the spectral sensitivity characteristic deriving apparatus shown in FIG. 1.

The metamer data inputting section 101 reads spectral distribution data S ($\lambda$) of light from an illuminant in an environment where the color matching experiment is performed, spectral reflectance factors of reference color stimuli used in the color matching experiment which are given by the expression (2) and spectral reflectance factors of n-pieces of color stimuli perceived by observation to be the same color as the reference color stimuli which are represented by the expression (3).

$$\rho_r(\lambda) \tag{2}$$

$$\{\rho_m^{(i)}(\lambda) : i = 1, \ldots, n\} \tag{3}$$

The metamer data storing section 102 stores the spectral distribution data S ($\lambda$) of the light from the illuminant read by the metamer data inputting section 101, spectral reflectance factors $\rho_r(\lambda)$ of reference color stimuli and spectral reflectance factors $$\rho_m^{(i)}(\lambda)$$

of n-pieces of color stimuli perceived by observation to have the same color as the reference color stimuli.

The noise averaging section 103 calculates the spectral distribution data $\Delta$ J ($\lambda$) obtained by averaging a product of a difference in the metamer data and the spectral distribution data S ($\lambda$) of the light from the illuminant. The difference in the metamer data is represented by the following expression (4).

$$\rho_m^{(i)}(\lambda) - \rho_r(\lambda) \tag{4}$$

The spectral distribution data $\Delta$ J ($\lambda$) storing section 104 stores the distribution data $\Delta$ J ($\lambda$) calculated by the noise averaging section 103.

Figure 3:
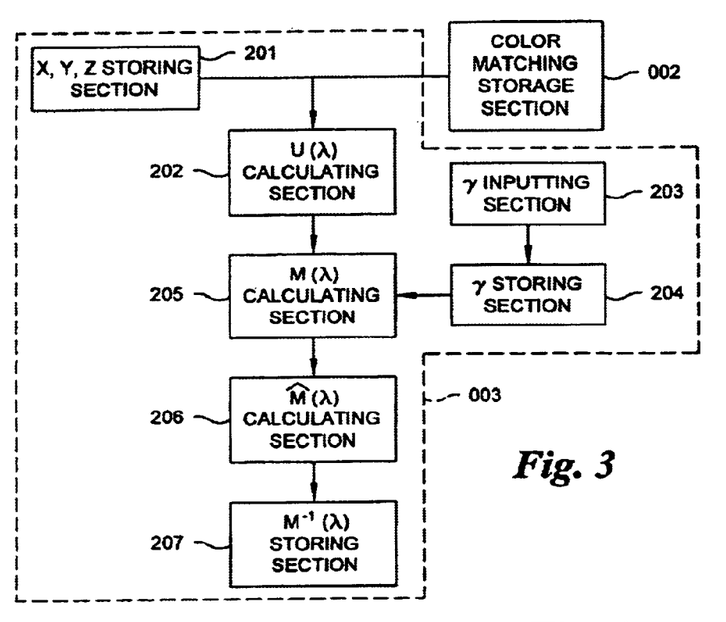
FIG. 3 is a block diagram showing, in detail, an objective function setting section in the spectral sensitivity characteristic deriving apparatus shown in FIG. 1.

FIG. 3 is a block diagram showing, in detail, the objective function setting section 003 of the spectral sensitivity characteristic deriving apparatus shown in FIG. 1. The Xw, Yw, Zw values storing section 201 stores Xw, Yw and Zw values being the CIE XYZ values at a white point in a specific illuminant (here, standard illuminant D65). The matrix U ($\lambda$) calculating section 202 receives the CIE XYZ values at the white point stored in the Xw, Yw, Zw values storing section 201 and the color function in the CIE XYZ colorimetric system which is the first objective function stored in the standard color matching function storing section 002 shown in FIG. 1 and calculates a matrix Û($\lambda$) represented by a determinant (6) which designates a second objective function to be employed in the uniform color space (here, CIE LAB color space).

$$\hat{U}(\lambda) \tag{6}$$

The $\gamma$ 1, $\gamma$ 2 inputting section 203 reads weighing coefficient parameters $\gamma$ 1 and $\gamma$ 2. The parameters $\gamma$ 1 and $\gamma$ 2 are the weighing coefficients required when the objective function in the CIE XYZ colorimetric system is bound to the objective function in the CIE LAB color space. The $\gamma$ 1, $\gamma$ 2 storing section 204 stores the weighing coefficient parameters $\gamma$ 1 and $\gamma$ 2 read by the $\gamma$ 1, $\gamma$ 2 inputting section 203.

The matrix M ($\lambda$) calculating section 205 receives the matrix represented by the expression (6) to designate the objective function in the CIE LAB color space from the matrix U ($\lambda$) calculating section 202 and the weighing coefficient parameters $\gamma$ 1 and $\gamma$ 2 from the $\gamma$ 1, $\gamma$ 2 storing section 204 and binds the first objective function in the CIE XYZ colorimetric system to the second objective function in the CIE LAB colorimetric system and then calculates a matrix represented by the expression (8) which designates a third objective function to be obtained after the binding.

$$\hat{M}(\lambda) \tag{8}$$

The inverse matrix calculating section 206 used to calculate an inverse matrix of a matrix $\hat{M}(\lambda)$ receives the matrix $\hat{M}(\lambda)$ represented by the expression (8) from the matrix M ($\lambda$) calculating section 205 and calculates the inverse matrix $\hat{M}^{-1}(\lambda)$ represented by the expression (9). The inverse matrix storing section 207 stores the inverse matrix $\hat{M}^{-1}$ ($\lambda$).

$$\hat{M}^{-1}(\lambda) \tag{9}$$

Figure 4:
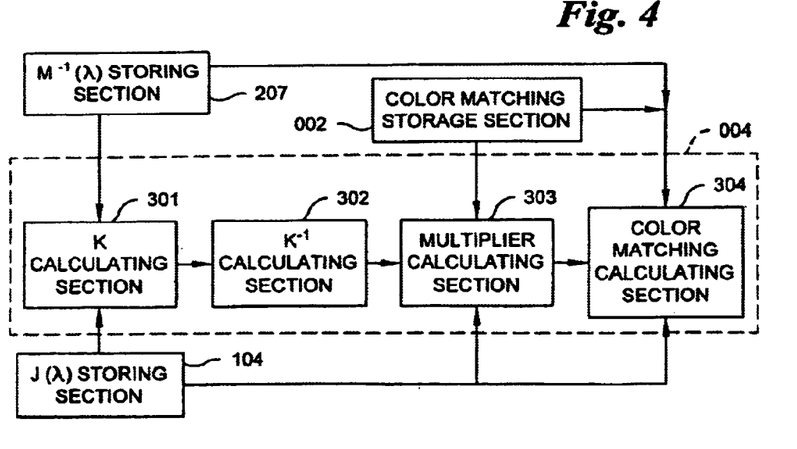
FIG. 4 is a block diagram showing, in detail, a amended color matching function calculating and processing section in the spectral sensitivity characteristic deriving apparatus shown in FIG. 1.

FIG. 4 is a block diagram showing, in detail, the amended color matching function calculating and processing section 004 in the spectral sensitivity characteristic deriving apparatus shown in FIG. 1. The matrix K calculating section 301 receives the distribution data $\Delta$ J ($\lambda$) from the distribution data $\Delta$ J ($\lambda$) storing section 104 in the metamer data processing section 001 and the inverse matrix represented by the expression (9) from the inverse matrix storing section 207 in the objective function setting section 003 and calculates the matrix represented by the expression (10) required to determine an undetermined multiplier. The K's inverse matrix calculating section 302 calculates the inverse matrix represented by the expression (11) which is the inverse matrix represented by the expression (10) calculated by the matrix K calculating section 301.

$$\hat{K} \tag{10}$$

$$\hat{K}^{-1} \tag{11}$$

The undetermined multiplier calculating section 303 receives the distribution data $\Delta$ J ($\lambda$) from the distribution data $\Delta$ J ($\lambda$) storing section 104, the color matching function in the CIE XYZ colorimetric system and the inverse matrix $\hat{K}^{-1}$ represented by the expression (11) calculated in the K's inverse matrix calculating section 302 and calculates the undetermined multiplier according to the method of Lagrange multipliers. The amended color matching function calculating section 304 receives the distribution data $\Delta$ J ($\lambda$) from the distribution data $\Delta$ J ($\lambda$) storing section 104, the color matching function in the CIE XYZ colorimetric system from the standard color matching function storing section 002, the inverse matrix $\hat{M}^{-1}(\lambda)$ represented by the expression (9) from the the inverse matrix storing section 207 used to store the inverse matrix of M ($\lambda$) and the undetermined multiplier calculated by the undetermined multiplier calculating section 303, that is, a determined multiplier, and calculates the amended color matching function.

Next, operations for the method for amending the spectral sensitivity characteristics by the spectral sensitivity characteristic deriving apparatus having configurations as above of the first embodiment will be described in detail by referring to FIGS. 1, 2, 3 and 4.

First, operations of the metamer data processing section 001 shown in FIG. 2 will be explained. The metamer denotes two color stimuli each having a different spectral reflectance factor perceived to be the same in color under a specified condition of light from the illuminant. Here, spectral distribution data S ($\lambda$) of light from the illuminant used in an environment where the color matching experiment is performed, the spectral reflectance factor, represented by the expression (2), of the reference color stimulus used in the color matching experiment and spectral reflectance factors represented by the expression (3) which are spectral reflectance factors of n-pieces of the color stimuli perceived to be the same as the reference color stimuli by the observation in the color matching evaluation experiment are called "metamer data".

The metamer data inputting section 101 reads these data and the metamer data storing section 102 stores the metamer data read by the metamer data inputting section 101. The metamer data processing section 001 is used to set the constraint required when an optimization problem is to be solved. Ordinarily, the CIE XYZ values for these metamer data observed as the same color in the color matching evaluation experiment are not equal. The relation of this disagreement is represented by an inequality (12).

$$\begin{cases} \sum_{\lambda} S(\lambda)\rho_r(\lambda)\bar{x}_1(\lambda)\Delta\lambda \neq \sum_{\lambda} S(\lambda)\rho_m^{(i)}(\lambda)\bar{x}_1(\lambda)\Delta\lambda, \\ \sum_{\lambda} S(\lambda)\rho_r(\lambda)\bar{x}_2(\lambda)\Delta\lambda \neq \sum_{\lambda} S(\lambda)\rho_m^{(i)}(\lambda)\bar{x}_2(\lambda)\Delta\lambda, \\ \sum_{\lambda} S(\lambda)\rho_r(\lambda)\bar{x}_3(\lambda)\Delta\lambda \neq \sum_{\lambda} S(\lambda)\rho_m^{(i)}(\lambda)\bar{x}_3(\lambda)\Delta\lambda. \end{cases} \quad (12)$$

where each of "$\bar{x}_1(\lambda), \bar{x}_2(\lambda), \bar{x}_3(\lambda)$" denotes color matching functions "$\bar{x}(\lambda), \bar{y}(\lambda), \bar{z}(\lambda)$" in the CIE XYZ colonmetric system and where the sum $$(\sum_{\lambda})$$

denotes a sum in a visible wavelength band and $\Delta\lambda$ denotes a discretized interval of a wavelength.

The amended color matching function to be obtained is represented by the expression (16). The amended color matching function is represented by a sum of the standard color matching function given by the expression (17) and the correcting color matching function given by the expression (18) for correction. The relation between them is represented by the expression (19).

$$(\tilde{x}_1(\lambda), \tilde{x}_2(\lambda), \tilde{x}_3(\lambda)) \quad (16)$$

$$(\bar{x}_1(\lambda), \bar{x}_2(\lambda), \bar{x}_3(\lambda)) \quad (17)$$

$$(\Delta x_1(\lambda), \Delta x_2(\lambda), \Delta x_3(\lambda)) \quad (18)$$

$$\tilde{x}_i(\lambda) = \bar{x}_i(\lambda) + \Delta x_i(\lambda), \, i=1,2,3. \quad (19)$$

It is necessary to have the amended color matching function make equal the CIE XYZ values of the metamer data observed in the color matching evaluation experiment. The condition for this is given by the expression (20).

$$\sum_{\lambda} \Delta J(\lambda)\tilde{x}_i(\lambda) = 0, \quad i = 1, 2, 3. \quad (20)$$

Here, the spectral distribution data $\Delta J(\lambda)$ is represented by the expression (21).

$$\Delta J(\lambda) = \frac{1}{n}\sum_{i=1}^{n} S(\lambda)(\rho_m^{(i)}(\lambda) - \rho_r(\lambda)), \quad (21)$$

The expression (20) shows the constraint imposed when the amended color matching function is calculated. The noise averaging section 103 calculates the spectral distribution data $\Delta J(\lambda)$ obtained by averaging a product of a difference in the metamer data represented by the expression (4) and the spectral distribution data S ($\lambda$) of the light from the illuminant. The distribution data $\Delta J(\lambda)$ storing section 104 stores the spectral distribution data $\Delta J(\lambda)$ calculated by the noise averaging section 103.

Next, operations of the objective function setting section 003 in the spectral sensitivity characteristic deriving apparatus shown in FIG. 3 will be explained. The objective function setting section 003 sets a third objective function required to determine the amended color matching function.

The third objective function to be obtained is the objective function with respect to the wavelength $\lambda$ which is represented by the expression (22). It is thought that the third objective function can be obtained by assigning weights to a first objective function represented by the expression (23) in the CIE XYZ colorimetric system and to a second objective function represented by the expression (24) in the CIE LAB colorimetric system and by binding these two functions together.

$$f(\vec{\Delta}x(\lambda)) \quad (22)$$

$$f_1(\vec{\Delta}x(\lambda)) \quad (23)$$

$$f_2(\vec{\Delta}x(\lambda)) \quad (24)$$

However, "$\vec{\Delta}x(\lambda)$" satisfies a relation given by the following expression (25).

$$\vec{\Delta}x(\lambda) = (\Delta x_1(\lambda), \Delta x_2(\lambda), \Delta x_3(\lambda)) \quad (25)$$

As the first objective function in the CIE XYZ colorimetric system, the following expression (26) is employed.

The expression (26) shows a total sum of the square of variations represented by the expression (27) with respect to the wavelength $\lambda$ of the correcting color matching function. The minimization of the first objective function represented by the expression (23) is equivalent to the minimization of the variations represented by the expression (27).

$$f_1(\vec{\Delta}x(\lambda)) = \sum_{i=1}^{3} (\tilde{x}_i(\lambda) - \bar{x}_i(\lambda))^2 = \sum_{i=1}^{3} \Delta x_i^2(\lambda). \quad (26)$$

$$\Delta x_i(\lambda) \quad (27)$$

As the second objective function in the CIE LAB color space, the expression (28) is employed.

$$f_2(\vec{\Delta}x(\lambda)) = \left[116\left\{g\left(\frac{\tilde{x}_2(\lambda)}{Y_w}\right) - 16\right\} - 116\left\{g\left(\frac{\bar{x}_2(\lambda)}{Y_w}\right) - 16\right\}\right]^2 +$$
$$\left[500\left\{g\left(\frac{\tilde{x}_1(\lambda)}{X_w}\right) - g\left(\frac{\tilde{x}_2(\lambda)}{Y_w}\right)\right\} - 500\left\{g\left(\frac{\bar{x}_1(\lambda)}{X_w}\right) - g\left(\frac{\bar{x}_2(\lambda)}{Y_w}\right)\right\}\right]^2 +$$
$$\left[200\left\{g\left(\frac{\tilde{x}_2(\lambda)}{Y_w}\right) - g\left(\frac{\tilde{x}_3(\lambda)}{Z_w}\right)\right\} - 200\left\{g\left(\frac{\bar{x}_2(\lambda)}{Y_w}\right) - g\left(\frac{\bar{x}_3(\lambda)}{Z_w}\right)\right\}\right]^2$$

where each of values represented by a first term, second term and third term of the left side denotes a difference in quantity being equal to sensitivity in L*, a*, b* in the CIE LAB color space and, as the function g ($\alpha$), either of the expressions (29a) or (29b) is selected according to the value "$\alpha$".

$$g(\alpha) = \alpha^{1/3} \tag{29a}$$

however, $\alpha > 0.00856$ $$g(\alpha) = 7.787\alpha + 16/116 \tag{29b}$$

however, $\alpha \leq 0.00856$

The minimization of the second objective function $f_2(\vec{\Delta}x(\lambda))$ is equivalent to the minimization of a difference in quantity being equal to sensitivity in the L*, a*, b* in the CIE LAB color space.

Since a case is considered where the variation $\Delta x_1(\lambda)$ is sufficiently smaller compared with the standard color matching function $\bar{x}_1(\lambda)$, after the Taylor's series expansion is performed and when the calculation is made to the second degree, the objective function in the CIE LAB color space is represented by the expression (31).

$$f_2(\vec{\Delta}x(\lambda)) = \vec{\Delta}x(\lambda)\hat{U}(\lambda)^t(\vec{\Delta}x(\lambda)) \tag{31}$$

where $^t( )$ denotes transposition and the matrix $\hat{U}(\lambda)$ is a real symmetric matrix represented by the expression (33).

$$\hat{U}(\lambda) = \begin{pmatrix} u_{11}(\lambda) & u_{12}(\lambda) & u_{13}(\lambda) \\ u_{12}(\lambda) & u_{22}(\lambda) & u_{23}(\lambda) \\ u_{13}(\lambda) & u_{23}(\lambda) & u_{33}(\lambda) \end{pmatrix}, \tag{33}$$

however, each of the matrix elements is as follows.

$$u_{11}(\lambda) = \left(\frac{500}{X_w}\right)^2 \left(g'\left(\frac{\bar{x}_1(\lambda)}{X_w}\right)\right)^2, \tag{34}$$

$$u_{22}(\lambda) = \frac{116^2 + 500^2 + 200^2}{Y_m^2}\left(g'\left(\frac{\bar{x}_2(\lambda)}{Y_w}\right)\right)^2,$$

$$u_{33}(\lambda) = \left(\frac{200}{Z_w}\right)^2\left(g'\left(\frac{\bar{x}_3(\lambda)}{Z_w}\right)\right)^2,$$

$$u_{12}(\lambda) = -\frac{500^2}{X_w Y_w}g'\left(\frac{\bar{x}_1(\lambda)}{X_w}\right)g'\left(\frac{\bar{x}_2(\lambda)}{Y_w}\right),$$

$$u_{23}(\lambda) = -\frac{200^2}{Y_w Z_w}g'\left(\frac{\bar{x}_2(\lambda)}{Y_w}\right)g'\left(\frac{\bar{x}_3(\lambda)}{Z_w}\right),$$

$$u_{33}(\lambda) = 0.$$

Here, the following expression (35) is used.

$$g'(\beta) = \frac{dg(\alpha)}{d\alpha}\bigg|_{\alpha=\beta}, \tag{35}$$

The matrix U ($\lambda$) calculating section 202, as described above, receives the CIE XYZ values at the white point stored in the Xw, Yw, Zw values storing section 201 and the color function in the CIE XYZ colorimetric system and calculates a matrix represented by the expression (33) which designates the objective function in the CIE LAB color space.

The third objective function represented by the expression (22) is obtained by assigning weights to the first objective function in the CIE XYZ colorimetric system and to the second objective function in the CIE LAB colorimetric system and by binding them together and is given by the following expression (36).

$$f(\vec{\Delta}x(\lambda)) = \gamma_1 f_1(\vec{\Delta}x(\lambda)) + \gamma_2 f_2(\vec{\Delta}x(\lambda)) = \vec{\Delta}x(\lambda)\hat{M}(\lambda)^t(\vec{\Delta}x(\lambda)) \tag{36}$$

However, "$\gamma 1, \gamma 2$" are real positive numbers. The matrix $\hat{M}(\lambda)$ is given as a real symmetric matrix as shown by the expression (37).

$$\hat{M}(\lambda) = \begin{pmatrix} m_{11}(\lambda) & m_{12}(\lambda) & m_{13}(\lambda) \\ m_{12}(\lambda) & m_{22}(\lambda) & m_{23}(\lambda) \\ m_{13}(\lambda) & m_{23}(\lambda) & m_{33}(\lambda) \end{pmatrix} = \tag{37}$$

$$\begin{pmatrix} \gamma_1 + \gamma_2 u_{11}(\lambda) & \gamma_2 u_{12}(\lambda) & \gamma_2 u_{13}(\lambda) \\ \gamma_2 u_{12}(\lambda) & \gamma_1 + \gamma_2 u_{22}(\lambda) & \gamma_2 u_{23}(\lambda) \\ \gamma_2 u_{13}(\lambda) & \gamma_2 u_{23}(\lambda) & \gamma_1 + \gamma_2 u_{33}(\lambda) \end{pmatrix},$$

The $\gamma 1, \gamma 2$ inputting section 203 shown in FIG. 3 reads the weighing coefficient parameters $\gamma 1$ and $\gamma 2$ and the read parameters $\gamma 1$ and $\gamma 2$ are stored in the $\gamma 1, \gamma 2$ storing section 204. Moreover, the matrix M ($\lambda$) calculating section 205 receives the matrix represented by the expression (33) from the matrix U ($\lambda$) calculating section 202 and the weighing coefficient parameters $\gamma 1$ and $\gamma 2$ from the $\gamma 1, \gamma 2$ storing section 204, and by using them, calculates the matrix represented by the expression (37).

The inverse matrix calculating section 206 used to calculate an inverse matrix of the matrix M ($\lambda$) receives the matrix represented by the expression (37) from the matrix M ($\lambda$) calculating section 205 and calculates the inverse matrix $\hat{M}^{-1}(\lambda)$ represented by the expression (9) which is required in the subsequent calculating process. The inverse matrix storing section 207 stores the inverse matrix represented by the expression (9) and calculated by the inverse matrix calculating section 206.

Next, operations of the amended color matching function calculating and processing section 004 shown in FIG. 4 will be described. The amended color matching function calculating and processing section 004 calculates, under the constraint set by the metamer data processing section 001 shown in FIG. 1, the correcting color matching function used to minimize the third objective function set by the objective function setting section 003 and, at the same time, an amended color matching function to be obtained from the sum of the calculated correcting color matching function and the standard color matching function.

To solve the optimization problem in which a variation $\vec{\Delta}x(\lambda)$ is to be obtained which satisfies the constraint represented by the expression (20) and minimizes the objective function $$\sum_\lambda f(\vec{\Delta}x(\lambda)), \qquad (5)$$

the method of Lagrange multipliers is used. The Lagrange's function is given by the expression (40).

$$F(\vec{\Delta}x(\lambda), \vec{u}) = \sum_\lambda f(\vec{\Delta}x(\lambda)) - \sum_{i=1}^{3} \mu_i \sum_\lambda \Delta J(\lambda)\bar{x}_i(\lambda) \qquad (40)$$

$$= \sum_\lambda \left[ \sum_{i=1}^{3} \sum_{i=1}^{3} m_{ij}(\lambda)\Delta x_i(\lambda)\Delta x_i(\lambda) - \Delta J(\lambda)\sum_{i=1}^{3} \mu_i\bar{x}_i(\lambda) \right].$$

where, $\vec{\mu} = (\mu_1, \mu_2, \mu_3)$ is the Lagrange's undetermined multiplier.

Since a result is 0 (zero) when the Lagrange's function F is partially differentiated with respect with $\vec{\Delta}x(\lambda)$, the above variation $\vec{\Delta}x(\lambda)$ is represented by the expression (42).

$$\vec{\Delta}x(\lambda) = \frac{1}{2}\Delta J(\lambda)\hat{M}^{-1}(\lambda)\vec{\mu}, \qquad (42)$$

By substituting the expression (42) representing the variation $\vec{\Delta}x(\lambda)$ for the constraint, the undetermined multiplier is determined as shown by the expression (43).

$$\begin{pmatrix} \mu_1 \\ \mu_2 \\ \mu_3 \end{pmatrix} = -\hat{K}^{-1} \sum_\lambda \Delta J(\lambda) \begin{pmatrix} \bar{x}_1(\lambda) \\ \bar{x}_2(\lambda) \\ \bar{x}_3(\lambda) \end{pmatrix} \qquad (43)$$

However, the matrix $\hat{K}^{-1}$ is the real symmetric matrix of 3×3, which is represented by the expression (44).

$$\hat{K} = \frac{1}{2}\sum_\lambda \Delta J^2(\lambda)\hat{M}^{-1}, \qquad (44)$$

The matrix K calculating section 301 receives the distribution data $\Delta J(\lambda)$ from the distribution data $\Delta J(\lambda)$ storing section 104 in the metamer data processing section 001 and the inverse matrix of $\hat{M}^{-1}(\lambda)$ of $M(\lambda)$ from the inverse matrix storing section 207 in the objective function setting section 003 and calculates the matrix K represented by the expression (10). The K' inverse matrix calculating section 302 calculates the inverse matrix $\hat{K}^{-1}(\lambda)$ of the matrix K calculated by the matrix K calculating section 301.

The undetermined multiplier calculating section 303 receives the distribution data $\Delta J(\lambda)$ from the distribution data $\Delta J(\lambda)$ storing section 104, the color matching function in the CIE XYZ colorimetric system from the standard color matching function storing section 002 and further the inverse matrix $\hat{K}^{-1}(\lambda)$ calculated by the K' inverse matrix calculating section 302 and, by using them, calculates the undetermined multiplier according to the method of Lagrange multipliers.

By substituting the expression (42) for the expression (19), the expression (45) to obtain the amended color matching function can be derived.

$$\begin{pmatrix} \tilde{x}_1(\lambda) \\ \tilde{x}_2(\lambda) \\ \tilde{x}_3(\lambda) \end{pmatrix} = \begin{pmatrix} \bar{x}_1(\lambda) \\ \bar{x}_2(\lambda) \\ \bar{x}_3(\lambda) \end{pmatrix} + \frac{1}{2}\Delta J(\lambda)\hat{M}^{-1}(\lambda)\begin{pmatrix} \mu_1 \\ \mu_2 \\ \mu_3 \end{pmatrix}. \qquad (45)$$

The amended color matching function calculating section 304 receives the distribution data $\Delta J(\lambda)$ from the distribution data $\Delta J(\lambda)$ storing section 104, the color matching function in the CIE XYZ colorimetric system from the standard color matching function storing section 002, the inverse matrix $\hat{M}^{-1}(\lambda)$ from the inverse matrix storing section 207 of $M(\lambda)$ and the undetermined multiplier calculated by the undetermined multiplier calculating section 303 and, by substituting them for the expression (45) and by performing an operation, calculates the amended color matching function represented by the left term of the expression (45).

The spectral sensitivity characteristic deriving section 005 shown in FIG. 1, in order to derive the spectral sensitivity characteristic of the color image inputting device from the amended color matching function calculated by the amended color matching function calculating and processing section 004, performs well-known linear transformation on the amended color matching functions.

The relation among the spectral sensitivity characteristics $(\tilde{r}(\lambda), \tilde{g}(\lambda), \tilde{b}(\lambda))$ of the color image inputting device, and a matrix $\hat{V}$ representing linear transformation from the standard color matching function $(\bar{x}_1(\lambda), \bar{x}_2(\lambda), \bar{x}_3(\lambda))$ is represented by the following expression (48).

$$\begin{pmatrix} \tilde{r}(\lambda) \\ \tilde{g}(\lambda) \\ \tilde{b}(\lambda) \end{pmatrix} = \begin{pmatrix} v_{11} & v_{12} & v_{13} \\ v_{21} & v_{22} & v_{23} \\ v_{31} & v_{32} & v_{33} \end{pmatrix} \begin{pmatrix} \bar{x}_1(\lambda) \\ \bar{x}_2(\lambda) \\ \bar{x}_3(\lambda) \end{pmatrix} = \hat{V}\begin{pmatrix} \bar{x}_1(\lambda) \\ \bar{x}_2(\lambda) \\ \bar{x}_3(\lambda) \end{pmatrix} \qquad (48)$$

where "$(\tilde{r}(\lambda), \tilde{g}(\lambda), \tilde{b}(\lambda))$" denotes the spectral sensitivity characteristic of the color image inputting device, "$(\tilde{x}_1(\lambda), \tilde{x}_2(\lambda), \tilde{x}_3(\lambda))$" denotes the stand matching function and "$\hat{V}$" denotes the matrix obtained by the linear transformation from the standard color matching function.

Based on the relation shown in the expression (48), the spectral sensitivity characteristic deriving section 005 of the present invention, using the expression (50), calculates the spectral sensitivity characteristic $(\tilde{r}(\lambda), \tilde{g}(\lambda), \tilde{b}(\lambda))$ obtained after the amendment from the amened color matching function $(\tilde{x}_1(\lambda), \tilde{x}_2(\lambda), \tilde{x}_3(\lambda))$ and the matrix $\hat{V}$.

$$\begin{pmatrix} \tilde{r}(\lambda) \\ \tilde{g}(\lambda) \\ \tilde{b}(\lambda) \end{pmatrix} = \hat{V}\begin{pmatrix} \tilde{x}_1(\lambda) \\ \tilde{x}_2(\lambda) \\ \tilde{x}_3(\lambda) \end{pmatrix}. \qquad (50)$$

Effects of First Embodiment

As described above, according to the first embodiment, by using each of the spectral reflectance factors of the pair of color stimuli being the metamer data observed as the same in color in the color matching evaluation experiment and each of the spectral reflectance factors of the color stimuli observed separately, under the constraint that the CIE XYZ values of the noise-averaged metamer data are made equal, the correcting color matching function is calculated which minimizes the third objective function obtained by assigning weights to the first objective function in the CIE XYZ colorimetric system and to the second objective function in the CIE LAB colorimetric system and binding them together and the amended color matching function is also calculated obtained by the amendment based on the sum of the correcting color matching function and the standard color matching function. By taking the minimization of the objective function into consideration, no difference is found in the form on a chromaticity diagram between the amended color matching function to be calculated and the standard color matching function and near values are provided by corresponding points between the amended color matching function and the standard color matching in the CIE LAB color space. Moreover, under the set constraint, by using the amended color matching function, the X value, Y value and Z value of the metamer data obtained from the color matching evaluation experiment can be made equal. By performing the linear transformation on the amended color matching function having such characteristics as described above, the properly-amended spectral sensitivity characteristic of the color image inputting device can be derived.

Second Embodiment

Figure 5:
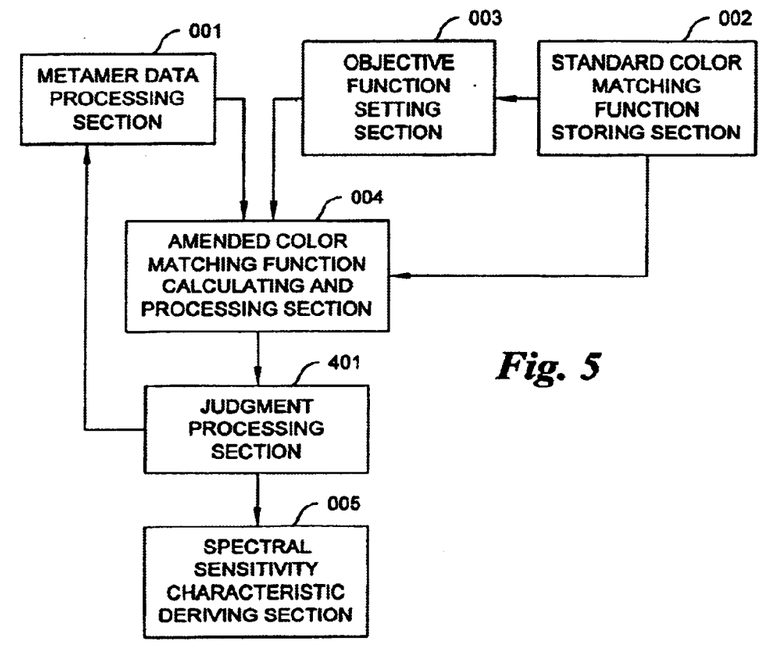
FIG. 5 is a block diagram showing a spectral sensitivity characteristic deriving apparatus according to a second embodiment.

Configurations in the second embodiment will be described in detail by referring to FIGS. 5 and 6. FIG. 5 is a block diagram showing an entire processing system of the second embodiment. As in the first embodiment, a metamer data processing section 001, a standard color matching function storing section 002, a objective function setting section 003, a amended color matching function calculating and processing section 004 and a spectral sensitivity characteristic deriving section 005 are provided. In the second embodiment, in addition to these components provided in the first embodiment, a conditional expression judgement processing section 401 is provided. The conditional expression judgement processing section 401 judges whether an amended color matching function calculated by the amended color matching function calculating and processing section 004. satisfies a condition.

Figure 6:
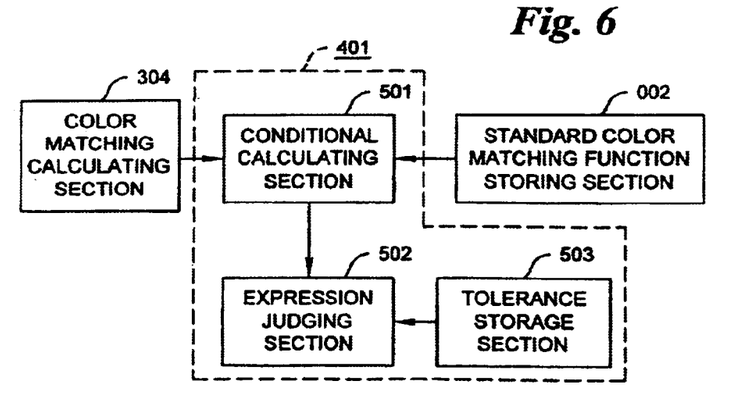
FIG. 6 is a block diagram showing a conditional expression judgement processing section in the spectral sensitivity characteristic deriving apparatus shown in FIG. 5.

FIG. 6 is a block diagram showing details of the conditional expression judgement processing section 401 in FIG. 5. The conditional expression calculating section 501 receives a color matching function in the CIE XYZ colorimetric system from the standard color matching storing section 002 used to store a standard color matching function and an amended color matching function calculated by the conditional expression calculating section 501 using the same procedures as employed in the first embodiment from an amended color matching function calculating section 304 in the amended color matching function calculating and processing section 004 and calculates a conditional expression to be satisfied by the amended color matching function. The tolerance storing section 503 stores, in advance, a tolerance value to be used in the conditional expression. The conditional expression judging section 502 receives the conditional expression to be satisfied by the amended color matching function from the conditional expression calculating section 501 and the tolerance value stored in the tolerance storing section 503 and judges whether the amended color matching function calculated by the amended color matching function calculating section 304 satisfies the conditional expression or not.

Next, operations in the second embodiment will be explained in detail by referring to FIGS. 5 and 6. In FIG. 5, each of the metamer data processing section 001, standard color matching function storing section 002, objective function setting section 003, amended color matching function calculating and processing section 004 and spectral sensitivity characteristic deriving section has the same functions as in the first embodiment. The conditional expression judgement processing section 401 judges whether the amended color matching function calculated by the amended color matching function calculating and processing section 004 satisfies a condition or not.

Operations of the conditional expression judgement processing section 401 shown in FIG. 6 will be explained. The conditional expression calculating section 501 receives a color matching function in the CIE XYZ colorimetric system being a first objective function represented by the expression (17) from the standard color matching function storing section 002 and an amended color matching function represented by the expression (16) calculated by the conditional expression calculating section 501 using the same procedures as employed in the first embodiment and calculates the conditional expression to be satisfied by the amended color matching function. The following expression (51) is used as the conditional expression.

$$\sum_{\lambda}\sum_{i=1}^{3}(\tilde{x}_i(\lambda) - \bar{x}_i(\lambda))^2 = \sum_{\lambda}\sum_{i=1}^{3}\Delta x_i^2(\lambda) \le (Const). \qquad (51)$$

Where "(Const)" denotes a tolerance stored in advance in the tolerance storing section 502.

The conditional expression (51) is explained. The expression (51) represents a condition that a total sum of a square of the variation represented by the expression (27), that is, the total sum of the square of a differential between the amended color matching function represented by the expression (16) calculated by the amended color matching function calculating section 304 and the standard color matching function represented by the expression (17) in a visible wavelength band does not exceed a tolerance.

When the amended color matching function represented by the expression (16) calculated by the amended color matching function calculating section 304 is to be obtained, if a weighing coefficient γ 1 of the first objective function represented by the expression (23) for the CIE XYZ colorimetric system being sufficiently larger than the weighing coefficient γ 2 of the second objective function represented by the expression (24) for the CIE LAB color space to be assigned by the objective function setting section 003 is used in the process of the calculation, under a constraint to minimize the variation $\Delta x_1 (\lambda)$, a value expressed by a left side of a sign of inequality represented by the conditional expression (51), that is, a third objective function is made minimum.

However, if the metamer data used to set the constraint is inexact, there is a case where, even if the value expressed by the left side of the conditional expression (51), that is, the third objective function is a minimum, an absolute value of the minimum value becomes large, under the constraint. The inexact metamer data means those being insufficiently accurate in perception of a subject even with normal color vision who fails to perceive two colors as the same accurately in the color matching evaluation experiment or those obtained from the observation of a subject with abnormal color vision. For example, if the amended color matching function is calculated based on the metamer data obtained from the subject with abnormal color vision, the amended color matching function being greatly different from the standard color matching function is obtained, which causes the improper amended color matching function to be derived. For this reason, as the conditional expression to be satisfied by the amended color matching function, the expression (51) showing that the amended color matching function is not different greatly from the standard color matching function has to be set.

The tolerance (Const) stored in the tolerance storing section 502 is a value obtained in advance by the color matching evaluation experiment. The conditional expression judgement section 503 receives the value expressed by the left side of the conditional expression (51) calculated by the conditional expression calculating section 501 and the tolerance value (Const) stored in the tolerance storing section 503 and judges whether the conditional expression (51) is true or false. The conditional expression judgement section 503, if the conditional expression is true, regards the amended color matching function calculated by the amended color matching calculating section 304 as a proper function and transfers it to the spectral sensitivity characteristic calculating and processing section 005. The conditional expression judgement section 503, if the conditional expression is false, regards the amended color matching function calculated by the amended color matching calculating section 304 as an improper function and promotes the metamer data obtained from a different color matching evaluatin experiment to be again inputted from the metamer data inputting section 101 in the metamer data processing section 001 and repeats a series of the processing until the conditional expression (51) becomes true. This enables a proper amended color matching function to be obtained.

Modified Embodiment of Second Embodiment

Other judgement conditions that can be employed by the conditional expression judgement processing section 401 shown in FIG. 6 will be explained. The conditional expression calculating section 501 receives the color matching function represented by the expression (17) in the CIE XYZ colorimetric system from the standard color matching function storing section 002 and the amended color matching function represented by the expression (16) by the conditional expression calculating section 501 using the procedures employed in the first embodiment from the amended color matching calculating section in the amended color matching function calculating and processing section 004 and calculates the conditional expression to be satisfied by the amended color matching function. As the conditional expression, instead of the expression (51), the following expression (52) is used which is set for every wavelength $\lambda$.

$$\sum_{i=1}^{3} (\tilde{x}_i(\lambda) - \bar{x}_i(\lambda))^2 = \sum_{i=1}^{3} \Delta x_i^2(\lambda) \leq (Const)(\lambda). \quad (52)$$

where "(Const) ($\lambda$)" denotes a tolerance value stored in the tolerance storing section 502 for every wavelength $\lambda$.

This conditional expression (52) will be explained. The expression (52) represents a condition that the total sum of the square of a differential between the amended color matching function represented by the expression (16) calculated by the amended color matching function calculating section 304 and the standard color matching function represented by the expression (17), that is, a total sum of a square of the variation represented by the expression (27) does not exceed a tolerance.

When the amended color matching function represented by the expression (16) calculated by the amended color matching function calculating section 304 is to be obtained, if a weighing coefficient $\gamma 1$ of the first objective function represented by the expression (23) for the CIE XYZ colorimetric system being sufficiently larger than the weighing coefficient $\gamma 2$ of the second objective function represented by the expression (24) for the CIE LAB color space to be assigned by the objective function setting section 003 is used in the process of the calculation, under a constraint to minimize the variation $\Delta x_1(\lambda)$, a value expressed by a left side of a sign of inequality represented by the conditional expression (52), that is, a third objective function is made minimum.

However, if the metamer data used to set the constraint is inexact, there is a case where, even if the value expressed by the left side of the conditional expression (52), that is, the third objective function is a minimum, an absolute value of the minimum value becomes large, under the constraint. The inexact metamer data means those being insufficiently accurate in perception of a subject even with normal color vision who fails to perceive two colors as the same accurately in the color matching evaluation experiment or those obtained from the observation of a subject with abnormal color vision. For example, if the amended color matching function is calculated based on the metamer data obtained from the subject with abnormal color vision, the amended color matching function being greatly different from the standard color matching function is obtained, which causes the improper amended color matching function to be derived. For this reason, as the conditional expression to be satisfied by the amended color matching function, the expression (52) showing that the amended color matching function is not different greatly from the standard color matching function has to be set.

The tolerance (Const) ($\lambda$) stored in the tolerance storing section 502 is set in advance by the color matching evaluation experiment. The conditional expression judgement section 503 receives the value expressed by the left side of the conditional expression (52) calculated by the conditional expression calculating section 501 and the tolerance value (Const) ($\lambda$) stored in the tolerance storing section 503 and judges whether the conditional expression (52) is true or false. The conditional expression judgement section 503, if the conditional expression (52) is true for all visible wavelength $\lambda$, regards the amended color matching function calculated by the amended color matching calculating section 304 as a proper function and transfers it to the spectral sensitivity characteristic calculating and processing section 005. The conditional expression judgement section 503, if there is even one wavelength $\lambda$ for which the conditional expression (52) is false, regards the amended color matching function calculated by the amended color matching calculating section 304 as an improper function and promotes the metamer data obtained from a different color matching evaluation experiment to be again inputted from the metamer data inputting section 101 in the metamer data processing section 001 and repeats a series of the processing until the conditional expression (52) becomes true for all visible wavelength $\lambda$. This enables a proper amended color matching function to be obtained.

As described above, according to the second embodiment, the amended color matching function can be calculated obtained by excluding the metamer data being insufficiently accurate in perception of the subject even with normal color vision who fails to perceive two colors as the same accurately in the color matching evaluation experiment or the metamer data obtained from the observation of the subject with abnormal color vision. By performing the linear transformation on the amended color matching function having such characteristics as described above, the properly-amended spectral sensitivity characteristic of the color image inputting device can be derived.

It is thus apparent that the present invention is not limited to the above embodiments but may be changed and modified without departing from the scope and spirit of the invention.

What is claimed is:

1. A method for deriving spectral sensitivity characteristics of a color image input device, comprising:
    a step of setting a constraint that tristimulus values of metamer data perceived to be the same in color by observation in a color matching evaluation experiment are made egual, to said metamer data;
    a step of obtaining a third objective function by assigning weights to a first objective function including a standard color matching function and to a second objective function in a uniform color space and by binding these two objective functions together;
    a step of obtaining, by using the method of Lagranae multipliers, a correcting color matching function used for correction to make said third objective function minimum under said constraint;
    a step of obtaining an amended color matching function to be amended based on a sum of said obtained correcting color matching function and said standard color matching function; and
    a step of obtaining spectral sensitivity characteristics amended by using said amended color matching function, wherein said metamer data includes spectral distribution data of light from an illuminant in an environment where said color matching evaluation experiment is performed, a spectral reflectance factor of a reference color stimulus used in said color matching evaluation experiment, and spectral reflectance factors of two or more color stimuli perceived to be the same in color as said reference color stimulus by observation in said color matching evaluation experiment.

2. A method for deriving spectral sensitivity characteristics of a color image input device, comprising:
    a step of setting a constraint that tristimulus values of metamer data perceived to be the same in color by observation in a color matching evaluation experiment are made equal, to said metamer data;
    a step of obtaining a third objective function by assigning weights to a first objective function including a standard color matching function and to a second objective function in a uniform color space and by binding these two objective functions together;
    a step of obtaining, by using the method of Lagrange multipliers, a correcting color matching function used for correction to make said third objective function minimum under said constraint;
    a step of obtaining an amended color matching function to be amended based on a sum of said obtained correcting color matching function and said standard color matching function; and
    a step of obtaining spectral sensitivity characteristics amended by using said amended color matching function, further comprising a step of excluding an inexact metamer data that is observed in said color matching evaluation experiment.

3. A spectral sensitivity characteristic deriving apparatus for obtaining spectral sensitivity characteristics, comprising:
    a metamer data processing section to set a constraint that tristimulus values of metamer data perceived to be the same in color by observation in a color matching evaluation experiment are made equal, to said metamer data;
    an objective function setting section to obtain a third objective function by assigning weights to a first objective function including a standard color matching function and to a second objective function in a uniform color space and by binding these two objective functions together; and
    an amended color matching calculating and processing section to obtain, by using the method of Lagrange multipliers, a correcting color matching function used for correction to make said third objective function minimum under said constraint, to obtain an amended color matching function to be amended based on a sum of said obtained correcting color matching function and said standard color matching function and to obtain spectral sensitivity characteristics amended by using said amended color matching function, wherein said metamer data includes spectral distribution data of light from an illuminant in an environment where said color matching evaluation experiment is performed, a spectral reflectance factor of a reference color stimulus used in said color matching evaluation experiment, and spectral reflectance factors of two or more color stimuli perceived to be the same in color as said reference color stimulus by observation in said color matching evaluation experiment.

4. A spectral sensitivity characteristic deriving apparatus for obtaining spectral sensitivity characteristics, comprising:
    a metamer data processing section to set a constraint that tristimulus values of metamer data perceived to be the same in color by observation in a color matching evaluation experiment are made equal, to said metamer data;
    an objective function setting section to obtain a third objective function by assigning weights to a first objective function including a standard color matching function and to a second objective function in a uniform color space and by binding these two objective functions together; and
    an amended color matching calculating and processing section to obtain, by using the method of Lagrange multipliers, a correcting color matching function used for correction to make said third objective function minimum under said constraint, to obtain an amended color matching function to be amended based on a sum of said obtained correcting color matching function and said standard color matching function and to obtain spectral sensitivity characteristics amended by using said amended color matching function, further comprising a conditional expression judgment processing section to exclude an inexact metamer data that is observed in said color matching evaluation experiment.

* * * * *